Aug. 14, 1923.
C. T. STEWART
FUEL FEED SYSTEM
Filed April 13, 1922   2 Sheets-Sheet 1
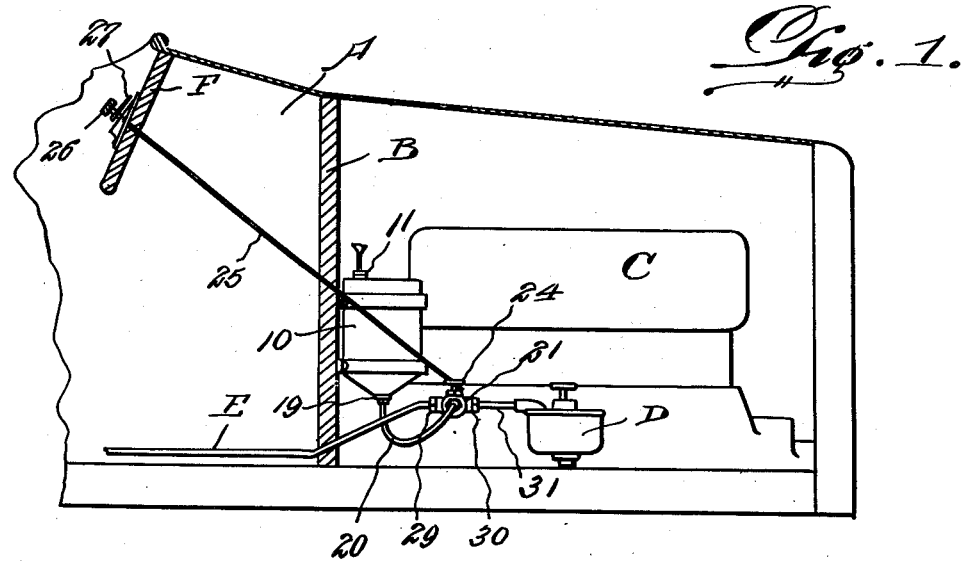
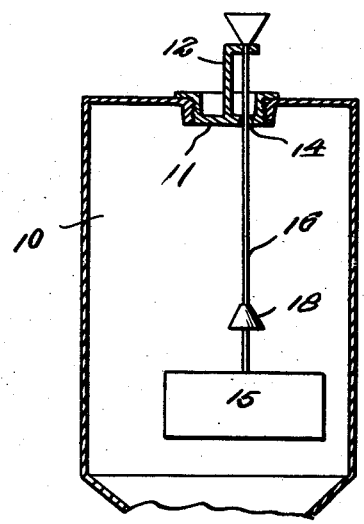
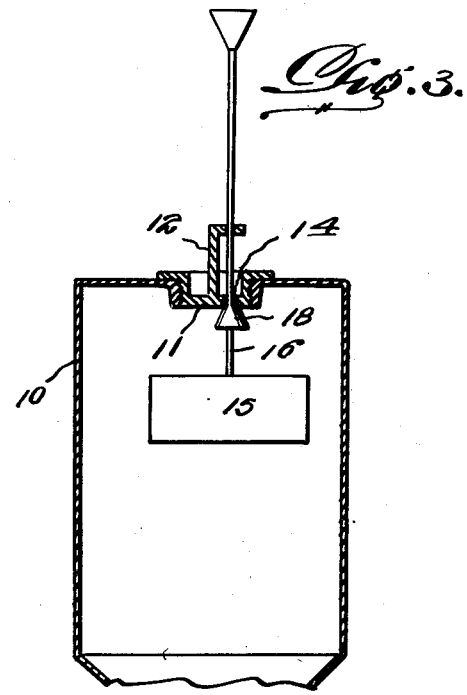
C. T. Stewart
INVENTOR Aug. 14, 1923.

C. T. STEWART

FUEL FEED SYSTEM

Filed April 13, 1922  2 Sheets-Sheet 2

C. T. Stewart.
INVENTOR

BY Victor J. Evans.
ATTORNEY

WITNESS:

Patented Aug. 14, 1923.

1,465,189

UNITED STATES PATENT OFFICE.

CLAY THOMAS STEWART, OF ROCHESTER, NEW YORK.

FUEL-FEED SYSTEM.

Application filed April 13, 1922. Serial No. 552,401.

*To all whom it may concern:*

Be it known that I, CLAY T. STEWART, a citizen of the United States, residing at Rochester, in the county of Monroe and State of New York, have invented new and useful Improvements in Fuel-Feed Systems, of which the following is a specification.

This invention relates to fuel feed systems for the engines of automobiles and has for its object the provision of an auxiliary tank mounted upon the dash and connected with the carbureter and the main gasoline tank whereby to insure a positive feed to the carbureter in the event that the car is being driven up a hill of such steepness that the gasoline will not flow from the ordinary tank, the auxiliary tank furthermore operating to hold a certain quantity of gasoline in reserve so that it may be used in the event that the main tank becomes empty and thus save the operator from walking a long distance to a gasoline filling station.

An important object is the provision of a novel connection between the main gas tank, the carbureter and the auxiliary tank, the connection consisting of a four way valve operable from the dash for permitting the gasoline to flow from the main tank directly to the carbureter from the auxiliary tank to the carbureter, from the main tank to the auxiliary tank and the carbureter at the same time, or to cut off the flow entirely.

An additional object is the provision of a fuel system of this character which will be simple and inexpensive in manufacture and installation, positive in action, efficient and durable in use and a general improvement in the art.

With the above and other objects and advantages in view the invention consists in the details of construction to be hereinafter more fully described and claimed, and illustrated in the accompanying drawings, in which:

Figure 1 is a side elevation of an automobile engine, with a portion of the automobile body shown in section, illustrating my device applied.

Figure 2 is a longitudinal section through the auxiliary tank showing it in empty condition, Figure 3 is a similar view showing it full.

Figures 4, 5, 6, and 7 are detail views of the control valve illustrating the different positions thereof.

Figure 8:
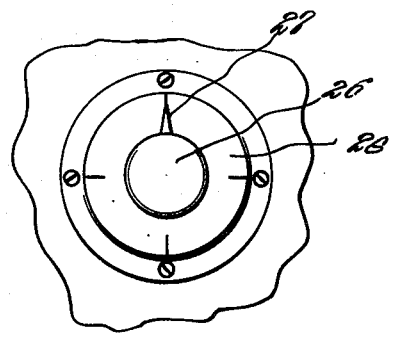

Figure 8 is a detail view of the indicating dial used in connection with the device.

Referring more particularly to the drawings the letter A designates a portion of an automobile, B designates the dash, C the engine, D the carbureter and E the main gasoline line.

In carrying out my invention I provide an auxiliary tank 10 which is secured upon the dash B by any suitable means and which is provided in its top with a filling opening normally closed by a screw cap 11 which is provided with an upward extension 12, and which is formed with a bore 13 which constitutes an air vent, this bore terminating at its lower end in a valve seat 14. Mounted within the tank is a float 15 carried by a stem 16 which slides through the bore 13 and through the guide extension 12 which has its upper end carrying a button which constitutes a gauge by means of which the operator can tell at a glance the depth or quantity of the gasoline within the tank and which also serves to prevent the stem from dropping down. Mounted on the stem 16 at the intermediate portion thereof is a valve 18 co-operating with the seat 14 for closing the vent when the auxiliary tank is full. These different positions are shown in Figures 2 and 3.

The bottom of the tank 10 is provided with an outlet connection 19 with which is connected a pipe 20 which leads to one of the nipples 21 of a control valve 22 which includes a casing within which is rotatable a plug 23 having a handle 24 with which is connected a rod 25 which leads through the dash to the instrument board F. The upper end of this rod carries a handle or knob 26 and a pointer 27 moved over a dial 28 having four graduations thereon corresponding to the four possible positions of the plug 23. The main gas line E is connected with one of the nipples 29 of the valve, while connected with the opposite nipple 30 is a pipe 31 which leads to the carbureter.

Figure 4:
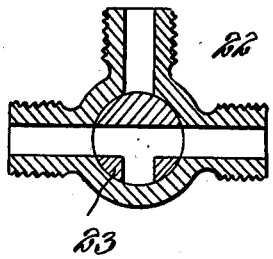

In the operation it will be seen that when the knob 26 is turned so that the pointer 27 will be over one of the graduations of the dial 28 the valve will be in the position shown in Figure 4 so that communication will be established from the main gas line E directly to the pipe 31 while the auxiliary tank is cut off. This will leave the tank 10 full so that it may constitute a reserve supply which may be used in case the main tank becomes empty or in case it is necessary to ascend a hill of such steepness that the gasoline will not feed from the main tank.

Figure 5:
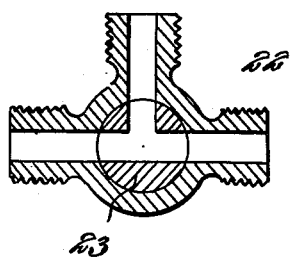

When the valve is in the position shown in Figure 5, which is effected by turning the knob 26, the gasoline will flow from the main line E to the pipe 31 and also through the pipe 20 so that the tank 10 will be filled while the vehicle is in operation.

Figure 6:
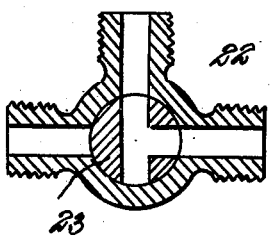

When the valve is in the position shown in Figure 6 the main gas line is cut off and communication will be established from the tank 10 through the pipe 20 and the pipe 31 so that the supply within the tank 10 may be used. The main gas line is then cut out.

Figure 7:
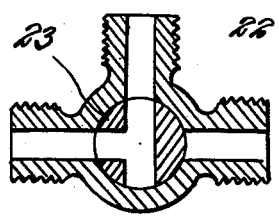

In the position shown in Figure 7 both the main line E and the auxiliary tank 10 will be cut off, this being desirable whenever it is necessary to make repairs to the carbureter.

When the valve is in the position shown in Figure 5, that is when the tank is being filled, it is apparent that as the gasoline rises within the tank 10 the float 15 will rise so that when the tank is full the valve 18 will engage the seat 14 and prevent the gasoline from running out. The valve stem has the important function of acting as a gasoline gage at all times so that the quantity in the tank may be ascertained instantly.

From the foregoing description and a study of the drawings it will be apparent that I have thus provided a simply constructed and consequently inexpensive fuel feed apparatus which will efficiently perform all the functions for which it is intended and which will be a distinct advantage and convenience for meeting various conditions which may arise. Owing to the simplicity of the construction and the fewness of the parts it is apparent that there is nothing to get out of order and that the device should consequently have a long life.

While I have shown and described the preferred embodiment of the invention, it is of course to be understood that I reserve the right to make such changes in the form, construction and arrangement of parts as will not depart from the spirit of the invention or the scope of the subjoined claim.

Having thus described my invention I claim:

In a device of the character described, an auxiliary tank, a control valve connected with said tank, a main line and a carburter, said tank having its top provided with a filling opening, a screw cap normally closing said opening and having its bottom formed with a bore constituting an air vent, the lower end of said bore being formed as a valve seat, a float within the tank, an upstanding guide bracket carried by the cap, a stem carried by the float slidable through said bore and bracket, and a valve carried by said stem adapted to close said seat, said stem operating as a gauge for indicating the quantity of gasoline within the auxiliary tank.

In testimony whereof I affix my signature.

CLAY THOMAS STEWART.